(12) United States Patent
Szabo et al.

(10) Patent No.: US 11,092,498 B2
(45) Date of Patent: Aug. 17, 2021

(54) THERMAL PROFILING SYSTEM AND METHOD

(71) Applicant: R.J. REYNOLDS TOBACCO COMPANY, Winston-Salem, NC (US)

(72) Inventors: David T. Szabo, Durham, NC (US); Stephen C. Reynolds, Dobson, NC (US); Josef Strasser, Greensboro, NC (US); Amanda S. Gammons, Winston-Salem, NC (US); Michael R. Kuhlman, Columbus, OH (US); Thomas Pettenski, Columbus, OH (US); George Brand, Columbus, OH (US); Kent C. Hofacre, Columbus, OH (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 83 days.

(21) Appl. No.: 16/149,719

(22) Filed: Oct. 2, 2018

(65) Prior Publication Data

US 2019/0098934 A1    Apr. 4, 2019

Related U.S. Application Data

(60) Provisional application No. 62/567,100, filed on Oct. 2, 2017.

(51) Int. Cl.
*G01J 5/00* (2006.01)
*G01K 13/00* (2021.01)
(Continued)

(52) U.S. Cl.
CPC ............... *G01K 13/00* (2013.01); *A24F 7/00* (2013.01); *A24F 40/80* (2020.01); *G01J 5/0875* (2013.01);
(Continued)

(58) Field of Classification Search
CPC combination set(s) only.
See application file for complete search history.

(56) References Cited

U.S. PATENT DOCUMENTS 5,060,671 A    10/1991    Counts et al.
5,388,594 A    2/1995    Counts et al.
(Continued)

*Primary Examiner* — Lisa M Caputo
*Assistant Examiner* — Nasir U. Ahmed
(74) *Attorney, Agent, or Firm* — Foley & Lardner LLP

(57) ABSTRACT

A thermal measurement system includes a thermocouple configured to couple to a location of a heating element of an electronic smoking article. The thermocouple is structured to measure a surface temperature of the location. A thermocouple data module is operatively connected to the thermocouple and is structured to receive data of the surface temperature from the thermocouple. A pneumatic system is configured to connect to an end of the electronic smoking article and draw an air flow through the electronic smoking article. The pneumatic system includes a solenoid valve having an open state that causes air to flow through the electronic smoking article. The solenoid valve has a closed state that prevents air flow through the electronic smoking article. An infrared camera is disposed over the viewing window. The infrared camera is configured to measure a wire temperature of a heating element wire of the electronic smoking article.

24 Claims, 14 Drawing Sheets

(51) Int. Cl.
  *A24F 7/00*     (2006.01)
  *G01K 7/02*     (2021.01)
  *G01J 5/08*     (2006.01)
  *A24F 40/80*    (2020.01)
  *A24F 40/10*    (2020.01)

(52) U.S. Cl.
  CPC ............. *G01K 7/02* (2013.01); *A24F 40/10* (2020.01); *G01J 2005/0077* (2013.01); *G01K 2213/00* (2013.01)

(56) References Cited

U.S. PATENT DOCUMENTS

| | | |
|---|---|---|
| 8,079,371 B2 | 12/2011 | Robinson et al. |
| 9,016,274 B1 | 4/2015 | White |
| 9,078,474 B2 | 7/2015 | Thompson |
| 2013/0255702 A1 | 10/2013 | Griffith et al. |
| 2014/0000638 A1 | 1/2014 | Sebastian et al. |
| 2014/0060554 A1 | 3/2014 | Collett et al. |
| 2014/0096781 A1 | 4/2014 | Sears et al. |
| 2014/0096782 A1 | 4/2014 | Ampolini et al. |
| 2014/0247339 A1* | 9/2014 | Brantley ................. A24C 5/32 348/86 |
| 2015/0059780 A1 | 3/2015 | Davis et al. |
| 2017/0045411 A1 | 2/2017 | Ademe |
| 2017/0059391 A1 | 3/2017 | Ademe |
| 2017/0208856 A1 | 7/2017 | Ademe |

\* cited by examiner

| Test ID | Operation |
|---|---|
| Electronic Smoking Article 2 | • Test completed without issue<br>• LED blinked white after puffing for puffs 165, 170, and 175 – 180 |
| Electronic Smoking Article 3 | • Test completed without issue through puff 168.<br>• LED blinked white after puffing for puffs 169 – 174<br>• Failed to puff (blinking white LED upon induced flow) on attempts 175 – 180 (test stopped) |
| Electronic Smoking Article 4 | • Test completed without issue through puff 166<br>• LED blinked white after puffing for puffs 167, and 173 – 177<br>• Failed to puff (blinking white LED upon induced flow) on attempts 178 – 180 (test stopped) |
| Electronic Smoking Article 5 | • Several incomplete activations throughout duration of test<br>• Did not include data in the analysis |
| Electronic Smoking Article 6 | • Test completed without issue |
| Electronic Smoking Article 7 | • Test completed without issues through puff 140, then incomplete activation on first puff attempt in puff set 8 and first 10 puff attempts and two additional puff attempts of puff set 9.<br>• LED blinked white during puffs 169, 175, and 180. |

FIG. 5

| Location | Average (±SD) Maximum Temperature (°C) | | | | | |
|---|---|---|---|---|---|---|
| | ESA-02 | ESA-03 | ESA-04 | ESA-06 | ESA-07 | |
| Substrate | 44 (±4) | 43 (±3) | 42 (±3) | 40 (±3) | 43 (±3) | |
| Flow Tube | 64 (±7) | 55 (±5) | 53 (±6) | 59 (±5) | 54 (±6) | |
| Sleeve Inside | 33 (±1) | 36 (±2) | 37 (±2) | 38 (±2) | 38 (±2) | |
| Mouthpiece | 33 (±1) | 31 (±1) | 32 (±1) | 33 (±2) | 32 (±2) | |
| Sleeve Outside | 33 (±1) | 34 (±1) | 32 (±1) | 33 (±1) | 33 (±2) | |
| Nichrome Wire | 410 (±46) | 330 (±31) | 310 (±60) | 460 (±59) | 380 (±67) | |

FIG. 6

| Test Article ID | Location | Puff set | | | | | | | | | | Aggregate | | | |
|---|---|---|---|---|---|---|---|---|---|---|---|---|---|---|---|
| | | 1 | 2 | 3 | 4 | 5 | 6 | 7 | 8 | 9 | Avg | SD | Min | Max |
| ESA-02 | Substrate | 39 | 42 | 43 | 43 | 44 | 46 | 46 | 47 | 49 | 44 | 3 | 32 | 52 |
| | Flow Tube | 54 | 59 | 58 | 59 | 65 | 67 | 68 | 70 | 72 | 64 | 7 | 45 | 77 |
| | Sleeve Inside | 34 | 35 | 32 | 32 | 32 | 32 | 32 | 32 | 33 | 33 | 1 | <30(a) | 35 |
| | Mouthpiece | 34 | 33 | 32 | 32 | 32 | 32 | 32 | 32 | 33 | 33 | 1 | <30 | 37 |
| | Sleeve Outside | 34 | 32 | 32 | 32 | 32 | 33 | 33 | 33 | 33 | 33 | 1 | <30 | 37 |
| ESA-03 | Substrate | 39 | 40 | 41 | 42 | 43 | 44 | 45 | 45 | 46 | 43 | 3 | 33 | 49 |
| | Flow Tube | 54 | 51 | 52 | 53 | 55 | 54 | 58 | 58 | 64 | 55 | 5 | 38 | 67 |
| | Sleeve Inside | 36 | 35 | 36 | 36 | 36 | 37 | 36 | 37 | 37 | 36 | 2 | <30 | 39 |
| | Mouthpiece | 31 | 31 | 31 | 31 | 31 | 31 | 31 | 31 | 31 | 31 | 1 | <30 | 34 |
| | Sleeve Outside | 36 | 34 | 34 | 34 | 34 | 34 | 35 | 35 | 35 | 34 | 1 | <30 | 37 |
| ESA-04 | Substrate | 41 | 39 | 40 | 40 | 41 | 42 | 43 | 44 | 45 | 42 | 3 | 31 | 49 |
| | Flow Tube | 63 | 49 | 48 | 48 | 50 | 52 | 55 | 55 | 57 | 53 | 6 | 40 | 81 |
| | Sleeve Inside | 37 | 38 | 36 | 36 | 37 | 37 | 38 | 37 | 37 | 37 | 2 | 31 | 42 |
| | Mouthpiece | 31 | 32 | 33 | 32 | 32 | 33 | 32 | 32 | 32 | 32 | 1 | <30 | 35 |
| | Sleeve Outside | 34 | 32 | 32 | 32 | 32 | 32 | 32 | 32 | 34 | 32 | 1 | 30 | 36 |
| ESA-06 | Substrate | 40 | 38 | 38 | 39 | 39 | 40 | 41 | 41 | 42 | 40 | 3 | 30 | 49 |
| | Flow Tube | 53 | 57 | 60 | 60 | 59 | 58 | 58 | 58 | 65 | 59 | 5 | 44 | 69 |
| | Sleeve Inside | 38 | 37 | 36 | 39 | 38 | 38 | 38 | 39 | 39 | 38 | 2 | 31 | 41 |
| | Mouthpiece | 37 | 33 | 34 | 34 | 33 | 33 | 32 | 32 | 32 | 33 | 2 | 31 | 40 |
| | Sleeve Outside | 34 | 32 | 32 | 32 | 33 | 33 | 33 | 33 | 34 | 33 | 1 | <30 | 36 |
| ESA-07 | Substrate | 41 | 41 | 43 | 44 | 44 | 44 | 44 | 45 | 46 | 43 | 3 | 35 | 49 |
| | Flow Tube | 49 | 47 | 49 | 55 | 55 | 57 | 57 | 59 | 58 | 54 | 6 | 38 | 69 |
| | Sleeve Inside | 39 | 38 | 39 | 39 | 38 | 36 | 36 | 36 | 38 | 38 | 2 | 30 | 41 |
| | Mouthpiece | 34 | 32 | 32 | 32 | 32 | 31 | 32 | 32 | 31 | 32 | 1 | <30 | 40 |
| | Sleeve Outside | 34 | 32 | 33 | 33 | 33 | 34 | 33 | 33 | 33 | 33 | 2 | <30 | 37 |

FIG. 7

| Test Article ID | | 1 | 2 | 3 | 4 | Puff Set 5 | 6 | 7 | 8 | 9 | All Puffs |
|---|---|---|---|---|---|---|---|---|---|---|---|
| ESA-02 | Avg | 300 | 401 | 408 | 407 | 421 | 431 | 431 | 434 | 455 | 412 |
| | SD | 59 | 10 | 11 | 10 | 10 | 14 | 19 | 22 | 25 | 46 |
| | Min | 212 | 381 | 374 | 366 | 380 | 374 | 354 | 341 | 350 | 212 |
| | Max | 393 | 410 | 421 | 418 | 428 | 441 | 441 | 452 | 472 | 472 |
| ESA-03 | Avg | 257 | 308 | 340 | 359 | 321 | 319 | 329 | 348 | 366 | 328 |
| | SD | 5 | 16 | 7 | 4 | 7 | 10 | 12 | 11 | 9 | 31 |
| | Min | 249 | 270 | 330 | 350 | 306 | 303 | 308 | 319 | 347 | 249 |
| | Max | 268 | 330 | 352 | 365 | 332 | 337 | 356 | 363 | 380 | 380 |
| ESA-04 | Avg | 212 | 198 | 302 | 295 | 337 | 323 | 355 | 370 | 347 | 305 |
| | SD | 22 | 33 | 8 | 15 | 11 | 24 | 6 | 6 | 21 | 60 |
| | Min | 160 | 146 | 290 | 266 | 316 | 230 | 336 | 360 | 285 | 148 |
| | Max | 240 | 264 | 315 | 318 | 371 | 351 | 363 | 381 | 368 | 381 |
| ESA-06 | Avg | 320 | 399 | 467 | 449 | 480 | 481 | 486 | 472 | 525 | 456 |
| | SD | 39 | 53 | 21 | 16 | 13 | 13 | 21 | 10 | 21 | 59 |
| | Min | 264 | 318 | 423 | 403 | 451 | 447 | 422 | 449 | 477 | 264 |
| | Max | 386 | 468 | 488 | 473 | 499 | 507 | 507 | 486 | 551 | 551 |
| ESA-07 | Avg | 225 | 309 | 382 | 366 | 424 | 409 | 413 | 444 | 396 | 377 |
| | SD | 46 | 26 | 21 | 31 | 29 | 26 | 21 | 44 | 19 | 67 |
| | Min | 169 | 256 | 332 | 300 | 330 | 344 | 348 | 345 | 351 | 169 |
| | Max | 300 | 353 | 412 | 410 | 447 | 430 | 446 | 493 | 424 | 493 |

FIG. 11

| Test Article ID | Puff Set | Average Mass TPM per Puff (mg) | Puff Flow Properties | |
|---|---|---|---|---|
| | | | t (sec) | V (mL) |
| ESA -02 | 1 | 2.2 | 3.1 | 56 |
| | 9 | 1.4 | 3.1 | 56 |
| ESA -03 | 1 | 1.9 | 3.1 | 57 |
| | 9 | 1.5 | 3.1 | 56 |
| ESA -04 | 1 | 1.7 | 3.1 | 56 |
| | 9 | 1.5 | 3.1 | 55 |
| ESA -06 | 1 | 1.9 | 3.0 | 54 |
| | 9 | 1.1 | 3.0 | 52 |
| ESA -07 | 1 | 1.8 | 3.0 | 54 |
| | 9 | 1.2 | 3.0 | 54 |

FIG. 13

THERMAL PROFILING SYSTEM AND METHOD

CROSS-REFERENCE TO RELATED APPLICATION

The present application claims benefit of and priority to U.S. Provisional Application No. 62/567,100 filed Oct. 2, 2017, the content of which is incorporated herein by reference in its entirety.

TECHNICAL FIELD

The present application relates generally to the field of smoking articles.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Publication No. 2013/0255702 to Griffith Jr. et al., U.S. Publication No. 2014/0000638 to Sebastian et al., U.S. Pat. No. 5,060,671 to Counts et al.; U.S. Pat. No. 9,016,274 to White; U.S. Pat. No. 9,078,474 to Thompson; U.S. Publication No. 2014/0060554 to Collett et al., U.S. Publication No. 2014/0096781 to Sears et al., U.S. Publication No. 2014/0096782 to Ampolini et al., and U.S. Publication No. 2015/0059780 to Davis et al., which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et. al, which are incorporated by reference in their entireties.

Popular electronic or electrically powered smoking articles (e.g., electronic cigarettes, E-cigarettes, etc.) (referred to herein collectively as "electronic smoking articles") often include a liquid storage component for storing aerosol precursor material (e.g., aerosol forming agent, liquid smoke, etc.), a vaporizing chamber with a heating coil attached for the aerosol precursor material to become vaporized therein, and a battery to power the device. The heating coil material typically includes a nickel/chromium wire, a titanium wire, nichrome wire, or similar alloy wires. The aerosol precursor material typically includes a mixture of propylene glycol, glycerin, nicotine, water and flavoring. Various electronic smoking articles have a single device which houses both the heating element and the aerosol precursor material in one unit, commonly referred to as a cartomizer.

Certain tobacco products that have employed electrical energy to produce heat for smoke or aerosol formation, and in particular, certain products that have been referred to as electronic cigarette products or electronic smoking articles, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™, HENDU™, JET™, MAXXQ™ PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™. In some of these electronic smoking articles, when the user inhales on the electronic smoking article, aerosol precursor material is 'pulled' from the reservoir into a vaporizing chamber using gravity and capillary in the wick. The aerosol precursor material is either adsorbed or resting on the electronic smoking article's heating apparatus and heated until it becomes vapor. The vapor is drawn away from the heated region of the device, where it subsequently cools and condenses into a high number density, generally sub-micron aerosol whereupon it then exits the device. The wick material can include any combination of silica, organic cotton, cellucotton rayon fibers, stainless steel, fiberglass, ceramic, and other materials with similar properties.

The United States Food and Drug Administration ("FDA") has authority to regulate the manufacture, marketing, and distribution of smoking articles, including cigarettes, cigarette tobacco, roll-your-own tobacco ("RYO"), and smokeless tobacco products to protect the public health and to reduce tobacco use by minors. In accordance with that authority, on May 10, 2016, the FDA issued a final rule deeming all products that meet the statutory definition of a tobacco product, except accessories of newly deemed tobacco products, to be subject to FDA's tobacco product authority. This statutory definition included electronic nicotine delivery systems (e.g., electronic smoking articles), vapes, cigars, hookah, pipe tobacco, nicotine gels, and dissolvables that were not already subject to the Federal Food, Drug, and Cosmetic Act, and other tobacco products that may be developed in the future (81 FR 28976). Under this authority, the FDA now requires electronic smoking articles to undergo the same FDA pre-market review and approval process as traditional smoking articles (e.g., cigarettes) undergo. Thus, electronic smoking articles and traditional smoking articles must undergo rigorous testing and characterization to obtain FDA approval for sale to the public. Accordingly, it would be desirable to provide a testing system that can be used to characterize and test a wide variety of electronic smoking articles through monitoring and capturing the thermal profile of target surfaces and locations on said smoking articles.

SUMMARY

Various example embodiments relate to a thermal measurement system. The thermal measurement system includes a thermocouple configured to couple to a location of a heating element of an electronic smoking article. The thermocouple is structured to measure a surface temperature of the location. A thermocouple data module is operatively connected to the thermocouple and is structured to receive data of the surface temperature from the thermocouple. A pneumatic system is configured to connect to an end of the electronic smoking article and draw an air flow through the electronic smoking article. The pneumatic system includes a solenoid valve having an open state that causes air to flow through the electronic smoking article. The solenoid valve has a closed state that prevents air flow through the electronic smoking article. An infrared camera is disposed over the viewing window. The infrared camera is configured to measure a wire temperature of a heating element wire of the electronic smoking article.

In another set of embodiments, a method for thermal measurement of an electronic smoking article is described. The method includes activating a pneumatic system in accordance with a determined puff regimen. The determined puff regimen is associated with testing one or more characteristics of the electronic smoking article. The pneumatic system includes a vacuum pump configured to pull air through the electronic smoking article via a tubing system and a solenoid valve. The solenoid valve has an open state and closed state. The open state causes air to flow through the electronic smoking article and the closed state prevents air flow through the electronic smoking article. The vacuum pump is adjusted to a determined target flow rate. The target flow rate associated with simulating a puff of the electronic smoking article. The solenoid valve is opened for a puff duration of the puff regimen. A surface temperature of a location of the electronic smoking article is captured using a thermocouple. A wire temperature of a heating element wire of the electronic smoking article is captured using an infrared camera.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

FIG. 5 is a summary table of the operation of a plurality of electronic smoking article characterized by the thermal profile system of FIG. 2.

FIG. 6 is a table of overall average maximum surface and wire temperatures for each of the electronic smoking articles of FIG. 5.

FIG. 7 is a table of the average maximum surface temperatures at each location and for each puff set for the electronic smoking articles of FIG. 5.

FIG. 11 is a table of average maximum temperature of the heating element for each puff set for each electronic smoking article of FIG. 5.

FIG. 13 is a table of the averaged measured total particulate matter per puff and puff flow properties of the electronic smoking articles of FIG. 5.

Figure 1:
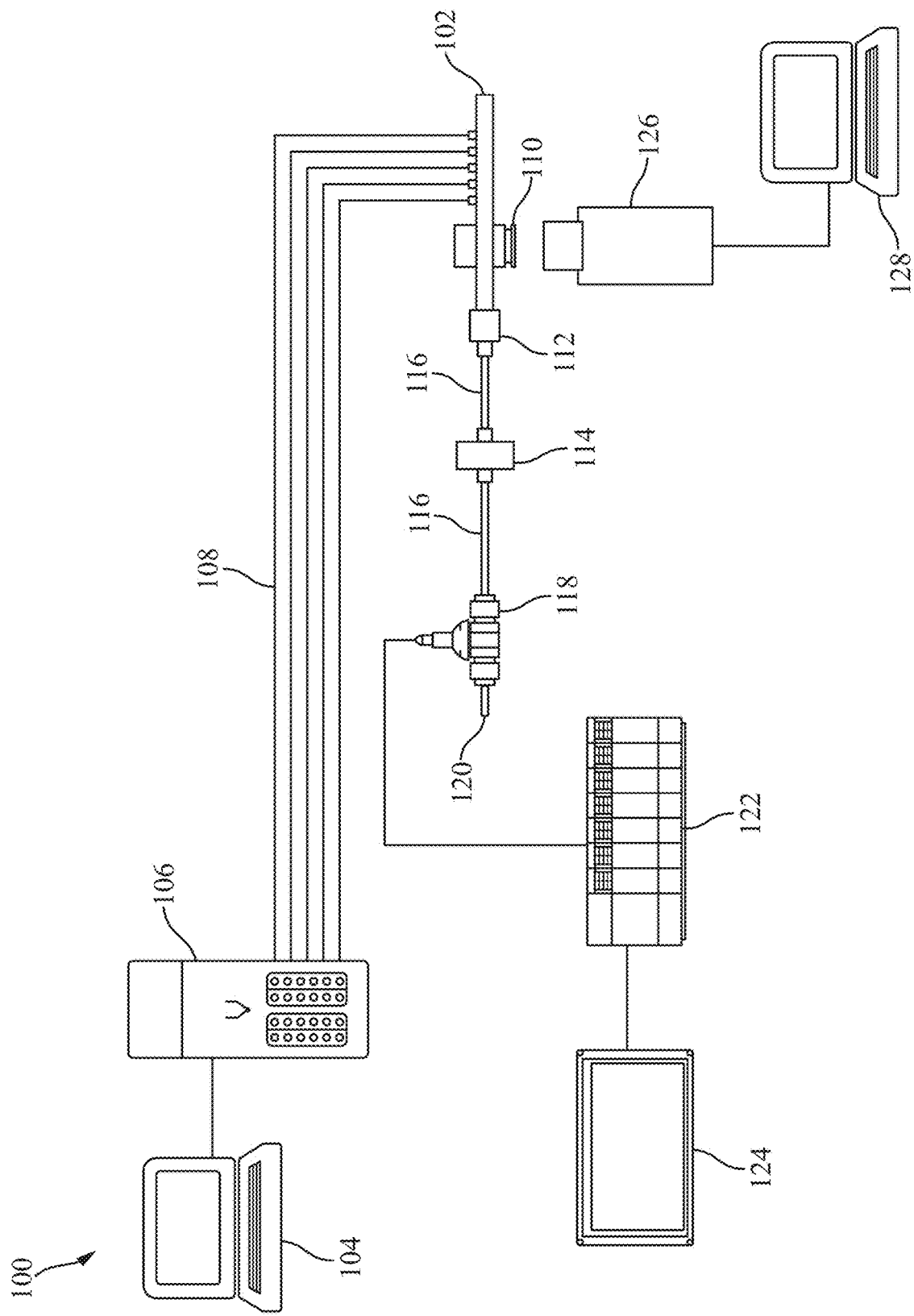
FIG. 1 is a perspective view of a thermal profile system for testing and characterizing an electronic smoking article, according to an example embodiment.

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

DETAILED DESCRIPTION

A thermal profile system provides testing methods to better understand and characterize electronic smoking articles to, in part, comply with governmental regulations and requirements related to characterizing and understanding smoking articles. In contrast to more conventional cigarettes, the byproduct generated by the electronic smoking article is not a smoke, but rather an aerosol or a vapor resulting from the volatilization or vaporization of certain components incorporated therein. For example, inhalable substances can be in the particulate matter fraction of the aerosol with some aerosol components in the true vapor phase or inhalable substances can be in the form of a vapor (i.e., a substance that is in the gas phase at a temperature lower than its critical point). For purposes of simplicity, the term "vaporized liquid" as used herein is meant to include vapors, gases, and particles, i.e., aerosols of a form or type suitable for human inhalation, whether or not visible, and whether or not of a form that might be considered to be smoke-like. The use of electronic smoking articles involves rapidly heating the liquid as air passes over the heating element to form the delivered vaporized liquid. By measuring the thermal profile of one or more target surfaces (e.g., locations) and the heating element, the operation of the electronic smoking article is better understood and appropriate modifications to the device can be done, if needed. Accordingly, the electronic smoking article can be characterized by the generation and performance of temperature profiles and emissivity generated within the device in order to better understand the device and, if applicable, better comply with FDA regulations and practices.

As described in greater detail herein, the thermal profile system can be used to conduct thermal profiling tests, emissivity tests, and other thermal characterizations of an electronic smoking article or smoking article. Emissivity tests refer to the testing of the ratio of the energy radiated from a material's surface to that radiated from a blackbody (a perfect emitter) at the same temperature and wavelength and under the same viewing conditions (e.g., emissivity). The emissivity of a surface depends not only on the material but also on the nature of the surface. Thermal profiling tests include, but are not limited to, testing the temperature of various surfaces and components of a smoking article.

While described herein as testing on an electronic smoking article, the thermal profile system can be applied to better understand and characterize traditional smoking articles (e.g., heat-not-burn, combustible cigs, etc.). The thermal profile system testing system is structured to comply with the requirements under the FDA Good Laboratory Practice ("GLP") Regulations 21 CFR 58 for the Conduct of Non-Clinical Studies. The thermal profile system and testing methods provide a better understanding of the operation of the smoking article, identification of maximum surface temperatures and locations, and characterization of the operation and function of the electronic smoking article. Beneficially, knowledge of maximum surface temperatures assists in the feasibility for off-gassing from components used to construct the electronic smoking article.

Referring to FIG. 1, a thermal profile system (e.g., measurement system) 100 for testing and characterizing a smoking article, namely an electronic smoking article 102, is shown, according to an example embodiment. While the thermal profile system can be applied to better understand and characterize a wide variety of smoking articles, including traditional smoking articles (e.g., heat-not-burn, combustible cigs, etc.), in the examples herein, the smoking article is in the embodiments depicted herein is an electronic smoking article 102. The thermal profile system 100 includes, a first computer 104 (for example, a personal computer), thermocouple data module 106, plurality of thermocouples 108, viewing window 110, connector 112, filter pad 114, pneumatic tubing 116, solenoid valve 118, vacuum source 120, programmable logic controller ("PLC") 122, human machine interface ("HMI") 124, infrared camera 126, and a second computer 128 (for example, a second personal computer). As will be appreciated, one or more components of the thermal profile system 100 may be removed, combined, or altered to test and characterize the function and operation of the electronic smoking article 102. The thermal profile system 100 can determine a wide variety of electronic smoking article 102 characteristics by simulating a wide variety of puffing characteristics that include, but are not limited to, puff volume (ml), puff duration (s), number of puffs, number of sub-puffs, mean and peak flow (ml/s), mean and peak draft (ml/s), mean and peak resistance, mean and peak pressure drop (mmWg), and inter puff interval (s).

The electronic smoking article 102 includes a rechargeable battery, a cartridge, and a mouth piece tip. The cartridge includes a plastic sleeve, heating element, wick, control chip and adsorbent pad. In some embodiments, the heating element includes a nichrome (e.g., an alloy of nickel, chromium, titanium, and iron) heating element. For testing within the thermal profile system 100, an electronic smoking article 102 can be modified or an electronic smoking article 102 specifically designed for testing may be used. The modifications include drilling holes for placing thermocouples with the cartridge, adding a slot to allow a direct line of sight to view the heating element, positioning the article in a path of ambient air, and similar modifications to effectuate the testing methods described herein. For example, the modified electronic smoking article can comprise a Vuse® electronic smoking article—where a "12 o'clock" position corresponds to the location of a metal contact pin—with a machine hole on the mouth piece end at a 3 o'clock position, a machine hole on the mouth piece end at a 6 o'clock position, and a machine hole on the connector end at a 6 o'clock position.

The plurality of thermocouples 108 include a connection to the electronic smoking article 102, the thermocouple data module 106 is operatively connected to the plurality of thermocouples 108, and the first computer 104 is operatively connected to the thermocouple data module 106. The plurality of thermocouples 108 are connected to the electronic smoking article 102 at one or more target locations within the electronic smoking article 102. The plurality of thermocouples 108 are configured to measure the surface temperature of the target locations within the electronic smoking article 102. The thermocouple data module 106 is structured to convert the measurements from the plurality of thermocouples 108 into temperature information. Temperature information is relayed from the thermocouple data module 106 to the first computer 104 as temperature data. The first computer 104 includes software that receives, analyzes, and configures the acquired data. The first computer 104 stores the thermocouple data received from the thermocouple data module 106. In some embodiments, the first computer 104 includes a data acquisition module.

To provide a constant air flow through the electronic smoking article 102 to simulate puffing, the mouth end of the electronic smoking article 102 is connected to pneumatic tubing 116 through a connector 112. The pneumatic tubing 116 is configured to provide air flow therethrough in response to the suction force of the vacuum source 120. In some embodiments, the pneumatic tubing 116 includes one or more critical flow orifice(s) to restrict the air flow through the pneumatic tubing 116 to achieve a desired flow rate. The filter pad 114 disposed between the vacuum source 120 and the electronic smoking article 102 serves to minimize condensation in the thermal profile system 100. As will be appreciated, the filter pad 114 is weighed for data collection of total particulate matter leaving the electronic smoking article 102 device during testing with the thermal profile system 100.

In order to control air flow through the electronic smoking article 102 to simulate a user puff, a PLC 122 is operatively connected to the solenoid valve 118 upstream from the vacuum source 120. The solenoid valve 118 includes an electromechanically operated valve that is activated by an electric current that runs through the solenoid valve 118. The PLC 122 controls the activation of the solenoid valve 118 and, therefore, controls the flow of air through the electronic smoking article 102. The solenoid valve 118 includes a first, open position and a second, closed position. When the solenoid valve 118 is not activated, the valve is closed and prevents the vacuum source 120 from pulling air through the pneumatic tubing 116 and the electronic smoking article 102. When the solenoid valve 118 is activated, the valve is open and allows the vacuum source 120 to pull air through the electronic smoking article 102 via the pneumatic tubing 116. The HMI 124 includes an operating screen that is operatively connected to the PLC 122. The HMI 124 includes start/stop buttons, puff count, puff intensity, puff duration, and other parameters of the simulated smoking cycle that are altered to facilitate the characterization of the electronic smoking article 102.

An infrared camera 126 is operatively connect to the second computer 128. The infrared camera 126 is positioned to view, through the viewing window 110, the heating coil of the electronic smoking article 102. The infrared camera 126 may comprise, for example, a FLIR IR camera collecting data at a rate of 9±1 Hz within ±15° C. of a reference temperature of 300±10° C. The second computer 128 has installed a software interface associated with the infrared camera 126 and is configured to record and store the video and data extracted from the infrared camera 126.

By way of example, and in one use testing implementation, the thermal profile system 100 is used to characterize the thermal profile of an electronic smoking article 102 under a specific puff regimen. The viewing window 110 and battery unit are attached to the modified electronic smoking article 102. A plurality of thermocouples 108 are attached to the electronic smoking article 102 at one or more surface location(s) of the electronic smoking article 102. The electronic smoking article 102 is then attached to the pneumatic tubing 116. The infrared camera 126 is positioned perpendicular to the viewing window 110 and focused on the wraps of the heating coil. The first computer 104 and the data capture software for the thermocouple is activated (e.g., opened and ready to capture, store, analyze data from the thermocouples 108). The second computer 128 and the data capture software for the infrared camera is activated (e.g., opened and ready to capture, store, analyze data from the infrared camera 126). The HMI 124 is activated causing puff simulation of the electronic smoking article 102 and proper operation is observed (e.g., the electronic smoking article 102 lights up, the thermocouples are active, etc.). The HMI 124 indicates completion of the testing and is deactivated. Subsequently, the first computer 104 and second computer 128 stop recording data and the recorded data is saved. The infrared camera data is replayed and viewed on the second computer 128, or comparable display device. This includes opening the infrared camera data file and placing a region of interest(s) over a target of pixels in the video corresponding to the heating coil area. The correct object parameter(s) are input into the data capture software for the infrared camera and a temporal plot is generated to display the region of interest(s). The infrared video is then replayed and saved in the desired format.

Figure 2:
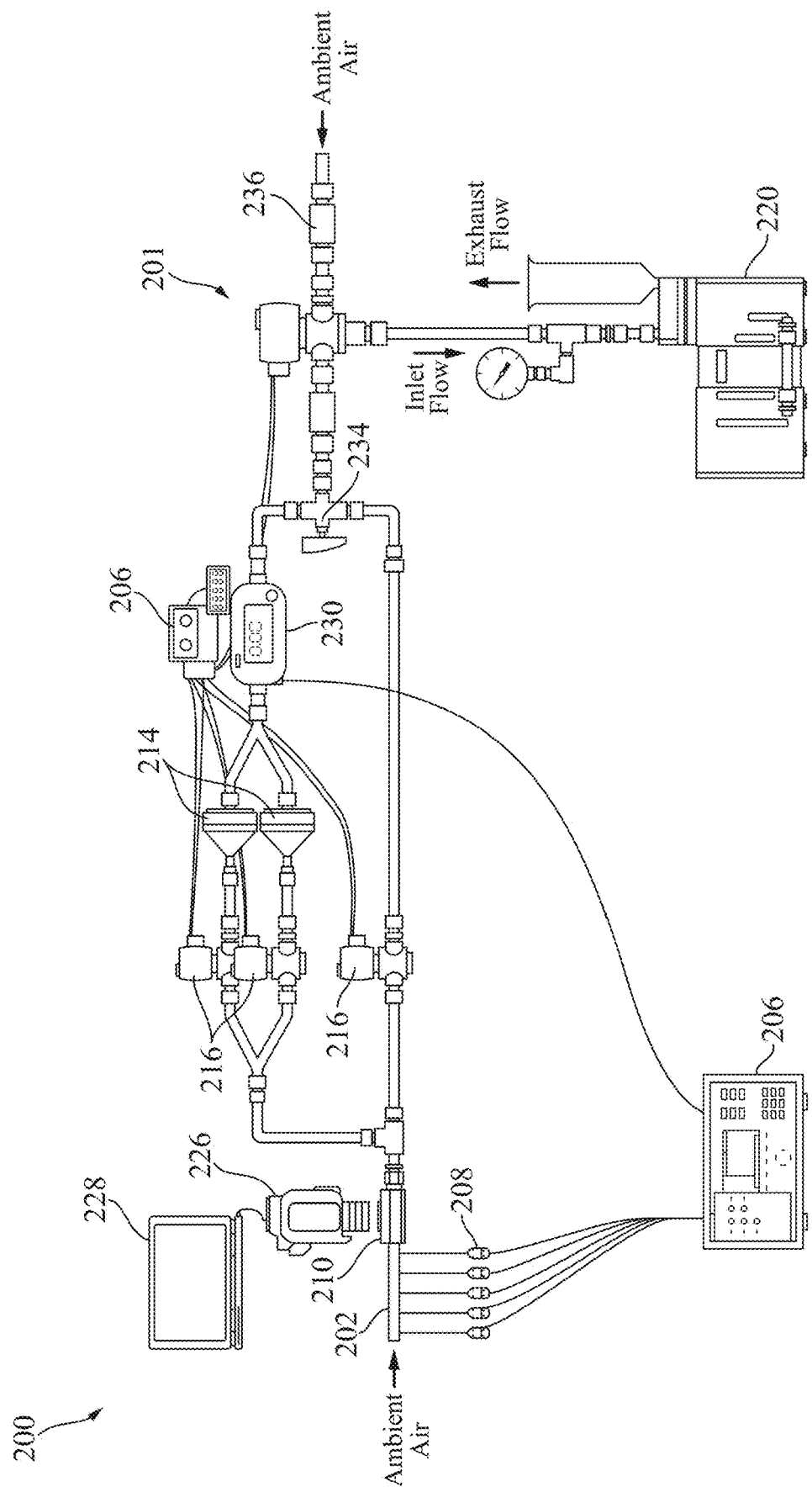
FIG. 2 is a perspective view of a thermal profile system for testing and characterizing an electronic smoking article, according to another example embodiment.

Turning to FIG. 2, a thermal profile system 200 for testing and characterizing an electronic smoking article 102 is shown, according to another example embodiment. The thermal profile system 200 is similar to the thermal profile system 100 of FIG. 1. Differences between the thermal profile system 200 and the thermal profile system 100 are the construction of the air flow simulation instrumentation and the configuration of the flow measuring and recording instrumentation. The thermal profile system 200 includes a pneumatic system 201, filter pads 214, a plurality of thermocouples 208, a flow cell 236, an infrared camera 226, and a data acquisition system 206. As will be appreciated, one or more components of the thermal profile system 200 may be removed, combined, or altered to test and characterize one or more thermal operations or functions of the electronic smoking article 202. In other words, the elements of the thermal profile system 200 are dependent upon the desired characteristics or features of the electronic smoking article 202 to be measured.

The pneumatic system 201 is configured to establish, control, and measure puff airflow by pulling air through the pneumatic system 201 and puffing (e.g., activating) the electronic smoking article 202. The pneumatic system 201 includes a valve system 216, three-way solenoid valve 218, vacuum pump 220, electronic timer 222, digital counter 232, mass flow meter 230, a three-way valve 234, and a control flow orifice 238. The pneumatic system 201 is able to establish and control flow through an electrically actuated three-way solenoid valve 218 for rapid and synchronized operation to achieve a square wave puff profile. Further, the manual three-way valve 234 provides additional isolation of the flow paths and reduction in void volume to achieve the square wave puff profile. In other embodiments, the manual three-way valve 234 provides additional isolation of the flow paths and reduction in void volume to achieve a non-square wave puff profile.

The electronic timer 222 is operatively connected to the solenoid valve 218 and structured to open and close the solenoid valve 218 in accordance with a target flow rate for a puff regimen. The electronic timer 222 achieves the desired puff duration for a puff regimen and can be changed as needed. The puff regimen is associated with one or more characteristics of the electronic smoking article 202 that are to identified and/or tested. As is readily apparent, the vacuum pump 220 drives airflow through the electronic smoking article 202 at a target flow rate of a puff regimen through the coordination and timing of the three-way solenoid valve 218 and electronic timer 222. Flow rate is controlled by the flow orifice 238 such that consistent and repeatable flow at the target rate is achieved on every puff. In some embodiments, the timing of the solenoid valve 218 activation controlled by the programmable electronic timer 222 achieves a 3-second puff duration. The solenoid valve 218 can comprise, for example, a P/N 664-2209 valve from Evolutionary Concepts Inc. and the electronic timer can comprise, for example, an Autopilot Master Digital Timer.

The flow of air through the electronic smoking article 202 passes through the valve system 216. As shown in FIG. 2, the valve system 216 has three pathways. The first and second pathway are in fluid communication with the filter pads 214 and the third pathway acts as a bypass tube, avoiding the filter pads 214. In some embodiments, a set of testing the electronic smoking article 202 may include passing the smoke through a first filter pad 214 for a first set of tests, passing the smoke through the bypass tube for a second set of tests, and passing the smoke through the second filter pad 214 for a third set of tests. This approach allows for the quantification of the Total Particulate Matter ("TPM") to demonstrate the operability of the electronic smoking article 202.

Additionally, the puff flow rate and duration are measured using a mass flow meter 230 at the beginning (e.g., the first puff set) and end (e.g., ninth and last puff set) of the puff regimen. The puff airflow measurements can coincide with aerosol collection using the filter pads 214. In some embodiments, the mass flow meter 230 response signal is captured using the data acquisition system 206 at a rate of 10 Hz. The mass flow meter 230 can comprise, for example, a TSI™ Model series 4100.

The filter pads 214 are configured to measure TPM of the electronic smoking article 202. Specifically, the filter pads 214 capture total aerosol-collected particulate matter for twenty puffs at the beginning (e.g., the first puff set) and end (e.g., the ninth and last puff set) of the puff regimen for subsequent gravimetric analysis to measure the TPM. As will be appreciated, measurement of the TPM demonstrates that the electronic smoking article 202 is a functioning (e.g., aerosol producing) product. The filter pads 214 can comprise, for example, 47-mm diameter filter pads from Performance Systematix Inc.

To measure surface temperatures at target locations within the electronic smoking article 202, a plurality of thermocouples 208 are used. As described in greater detail in FIGS. 4A & 4B, the plurality of thermocouples 208 are disposed at various locations along the electronic smoking article 202 and, in some embodiments, along the heating element of the electronic smoking article 202. To ensure the thermocouples 208 are properly calibrated, each thermocouple 208 may be placed in boiling water with the readings compared to a calibrated reference thermocouple. The plurality of thermocouples 208 may be similar to, for example, Type E thermocouples from Omega Engineering.

The data acquisition system 206 is operatively connected to the plurality of thermocouples 208 and is structured to collect measurements from the transmitted by the thermocouples 208. Further, the data acquisition system 206 can capture ambient environmental conditions signals and puff airflow rate for subsequent analysis. In some embodiments, the measurements are collected and recorded at 10 Hz. Beneficially in those embodiments, the data acquisition system 206 is initiated before the first puff of the first set through at least five minutes after the last puff of the last puff set. This results in continuously collected data for the duration of the puff regimen that includes the nominal ten-minute inactive time interval between puff sets. The data acquisition system 206 can comprise, for example, a Yokogawa™ MW100 data acquisition system.

The open exhaust end of the electronic smoking article 202 is connected to a flow cell 236 configured to permit viewing of the electronic smoking article 202 heating element with the infrared camera 226. The infrared camera 226 is orientated in a position perpendicular to the axis of the electronic smoking article 202 to view through a viewing window 210 on the flow cell 236. The viewing window 210 is structured to allow the infrared camera 226 to view the heating element of the electronic smoking article 202 with sufficient resolution to resolve the heating element (e.g., wire) from the surrounding background. The viewing window 210 can comprise, for example, a germanium, zinc selenide, calcium fluoride, and/or sapphire infrared viewing window. In some embodiments, the viewing window 210 is installed in a door of an electrical panel. This allows the infrared camera operator to take images of the circuit components inside the panel without being exposed to the circuit. The infrared camera 226 includes a non-contact, thermal imaging method to measure the wire temperature of the heating element. The infrared camera 226 collects data at a rate of 9±1 Hz, or other rate tailored to the testing parameters, and input to infrared camera software on a computing device 228.

By way of example, and in one use testing implementation, the thermal profile system 200 is used to characterize the thermal profile of an electronic smoking article 202 under a specific puff regimen. As used herein, a "puff regimen" refers to the testing parameters for puffing the electronic smoking article 202. A puff regimen may include one or more puff sets, that includes one or more puff cycles, with each cycle include a puff duration of a puff volume and a puff pause duration. For example, a puff regimen includes a 3±0.3 sec puff duration followed by 27±1 sec pause (30±1 sec total cycle time), a 55±3 mL puff volume (determined from puff duration and puff flow rate; a nominal 1.1 L/min average airflow rate through test article for 3 sec), 20-puff cycles per puff set (equates to 10 min of simulated puffing), nine puff sets, and a 10±1 min pause between the puff sets. Thus, the puffing regimen is expected to "test" approximately 180 puffs (9 puff sets with 20 puffs per set). As will be appreciated, the "end of life," and therefore what constitutes a puff or stated puff, is defined by the electronic smoking article being evaluated. In some embodiments, the electronic smoking article 202 is configured to illuminate a light emitting diode ("LED") on the battery upon activation by induced airflow via the pneumatic system 201. As will be appreciated, under normal use, the light illuminates constantly while there is adequate airflow, but nearing the end of use (e.g., nearing 180 puffs) it may also flash a white light. In the event that the puff engine induced airflow, but did not cause the LED indicator to illuminate white (constant or flashing), it would not be considered a "puff" for the purposes of characterizing the electronic smoking article 202.

The parameters measured and the data collected include: five selected surface temperatures within the electronic smoking article 202 as indicated by the thermocouples 208; a temperature of the wire heating element temperature as indicated by the infrared camera 226; a puff flow rate and duration; and TPM generated by the electronic smoking article 202. Capturing the temperature data from the target locations on the heating element by the thermocouples 208 can occur simultaneously with the infrared camera 226 capturing the heating coil temperature. Additionally, ancillary measurements of the ambient laboratory temperature and relative humidity, and the quantity of e-liquid added can be collected to further characterize the electronic smoking article 202.

By way of example, and in another use testing implementation, the thermal profile system 200 is used to characterize the emissivity (e.g., emissivity mapping) of an electronic smoking article 202 under a specific puff regimen. Specifically, the thermal profile system 200 is used to evaluate changes in efficiency of infrared emittance of the heater wire of the heating element of the electronic smoking article 202 during usage. The thermal profile system 200, tailored to characterize the emissivity of the electronic smoking article 202 includes an infrared camera for capturing a video of the heater wire during puffing (e.g., simulated puffing by the pneumatic system 201) and a thermocouple to provide a contact measurement of temperature. This thermal profile system 200 also includes data acquisition module and software to transfer the thermocouple readings to a computer and infrared camera software to provide a user interface to record the video and view the thermal data from the video. As will be appreciated, the number of thermocouples (e.g., one instead of multiple) and placement of thermocouple within the electronic smoking article 202 for emissivity mapping is different for thermal profiling.

The emissivity mapping is captured by taking temperature data from a target location on the heater coil with both the thermocouple and infrared camera at the same time. Then the data from both the thermocouple and infrared camera are analyzed. Using the thermocouple as a reference temperature, and manipulating the camera software, changes in the emissivity of the heater coil over the life of the test can be determined. These emissivity changes can then be applied as a parameter in the infrared camera software and used in the formal thermal profiling test.

One possible emissivity testing implementation comprises modifying the electronic smoking article 202 by attaching a thermocouple 208 to the heating coil of the heating element of an electronic smoking article 202. A viewing window 210 having a line of sight to the heating coil of the heating element is attached to the electronic smoking article 202. The electronic smoking article 202 is attached to the pneumatic system 201. The thermocouple 208 is attached to a data acquisition system 206. An infrared camera 226 is adjusted to align with the orientation of the viewing window 210 to have the greatest number of wraps of the heating coil "in focus." The thermocouple 208 and infrared camera 226 are activated and begin capturing data. Subsequently, the pneumatic system 201 is activated and controlled, for example, by the electronic timer 222 and digital counter 232, to achieve the desired puff regimen of the emissivity test. The thermocouple data and infrared camera data are stopped and saved. A region of interest is identified that corresponds to the location of the thermocouple. The peak temperature of the thermocouple data for the region of interest is identified and recorded for each puff. The peak temperature infrared camera data is identified and recorded for each puff. The peak temperature of the thermocouple data and the peak temperature of the infrared camera data are compared to determine alignment. As will be appreciated, the "correct" emissivity value for the region of interest of the electronic smoking article 202 occurs when the peak temperature of the thermocouple data and the peak temperature of the infrared camera data best align. If the peak temperature of the thermocouple data and the peak temperature of the infrared camera data do not align, the emissivity value in the infrared camera software is adjusted until the thermocouple and infrared camera data reaches this alignment. As will be appreciated, the thermal profile system 100 of FIG. 1 can be used in a similar manner to the one outlined above to characterize the emissivity (e.g., emissivity mapping) of an electronic smoking article 202 under a specific puff regimen. Further, in some embodiments, the emissivity testing includes the use of more than one thermocouples attached to the heating element. As will be appreciated, the testing process outlined above for one thermocouple is substantially similar to testing implementations with multiple thermocouples, with a difference being the multiple thermocouple implementations have more than one thermocouple data sources to align with the infrared camera data.

Figure 3A:
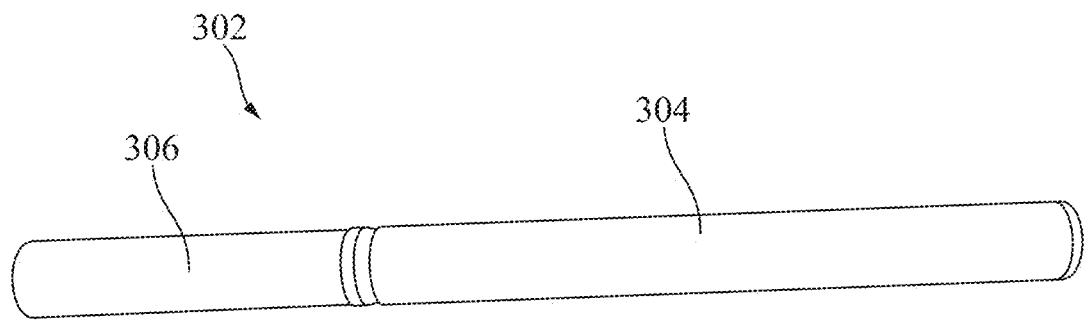
FIG. 3A is a perspective view of an electronic smoking article for use with a thermal profile system, according to an example embodiment.
Figure 3B:
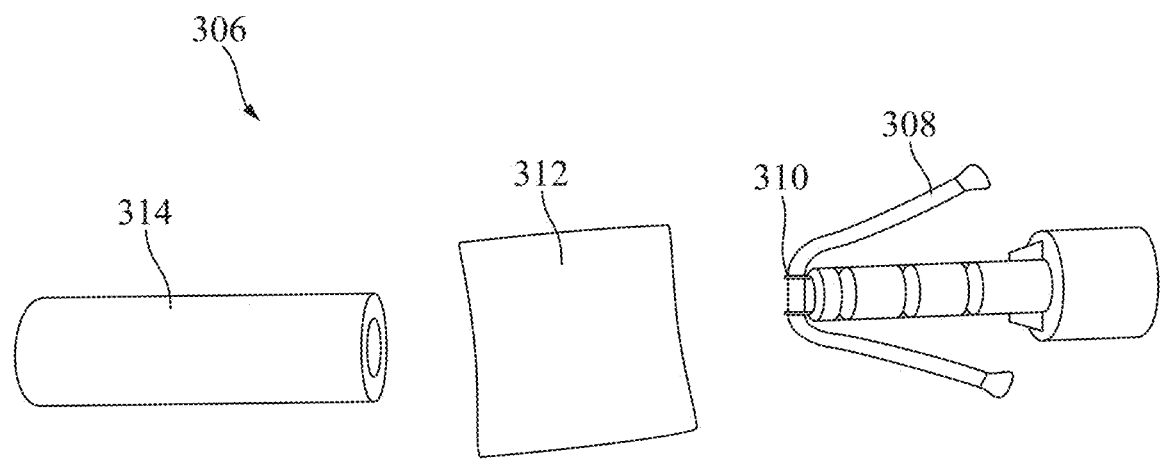
FIG. 3B is a perspective view of the unassembled cartridge of electronic smoking article of FIG. 3A.

Referring to FIG. 3A, an electronic smoking article 302 for use with a thermal profile system is shown, according to an example embodiment. The electronic smoking article 302 includes a battery 304 and a cartridge 306. As shown in FIG. 3B, the unassembled cartridge 306 includes a wick 308, a wire (e.g., nichrome) heating element 310, an absorbent pad (e.g., substrate) 312, a plastic sleeve 314, and a control chip (not shown).

Figure 4A:
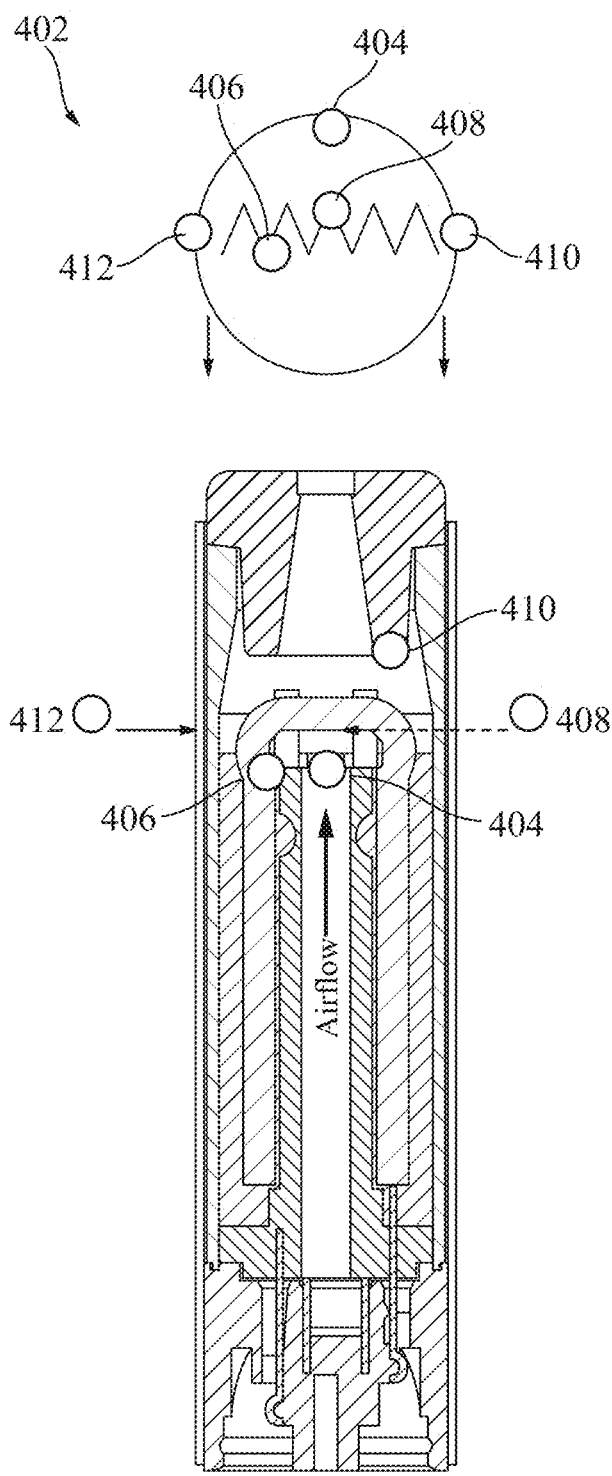
FIG. 4A is a pair of perspective views of a modified electronic smoking article for testing in a thermal profile system, according to an example embodiment.

For use in the thermal profile systems, the electronic smoking article 302 is modified to accommodate one or more thermocouples and a viewing window for an infrared camera. Referring to FIG. 4A, a pair of views of a modified electronic smoking article 402 for testing in a thermal profile system are shown, according to an example embodiment. The top view is a cross-sectional view of the heating coil with the viewing window 416 facing downward. The bottom view is a cross-sectional side view of the electronic smoking article 402. The modified electronic smoking article 402 includes five thermocouples (404, 406, 408, 410, 412) and a viewing slot (not shown) for an infrared camera. The viewing slot allows for the infrared camera to have a direct line of sight to view the heating element and capture the thermal imaging. A first thermocouple 404 is disposed on the substrate perpendicular to the heater coil. A second thermocouple 406 is disposed on the flow tube directly under the heater coil. A third thermocouple 408 is disposed on the internal surface of a sleeve, perpendicular to the heater coil. A fourth thermocouple 410 is disposed on the mouth piece of the electronic smoking article 402, in-line with the heater coil. A fifth thermocouple 412 is disposed on an outer surface of the electronic smoking article 402, in-line with the heater coil. In some embodiments, the junctions (e.g., sensing regions) of the thermocouples are not covered with adhesive, thereby allowing the test junction to move during assembly and limits the introduction of measurement artifacts. As will be appreciated, the number and location of the thermocouples varies in accordance with the specific testing parameters and the desired characteristic to be measured of the electronic smoking article using the thermal profile system. For example, for emissivity mapping an electronic smoking article, a single thermocouple is used disposed on the heater coil.

Figure 4B:
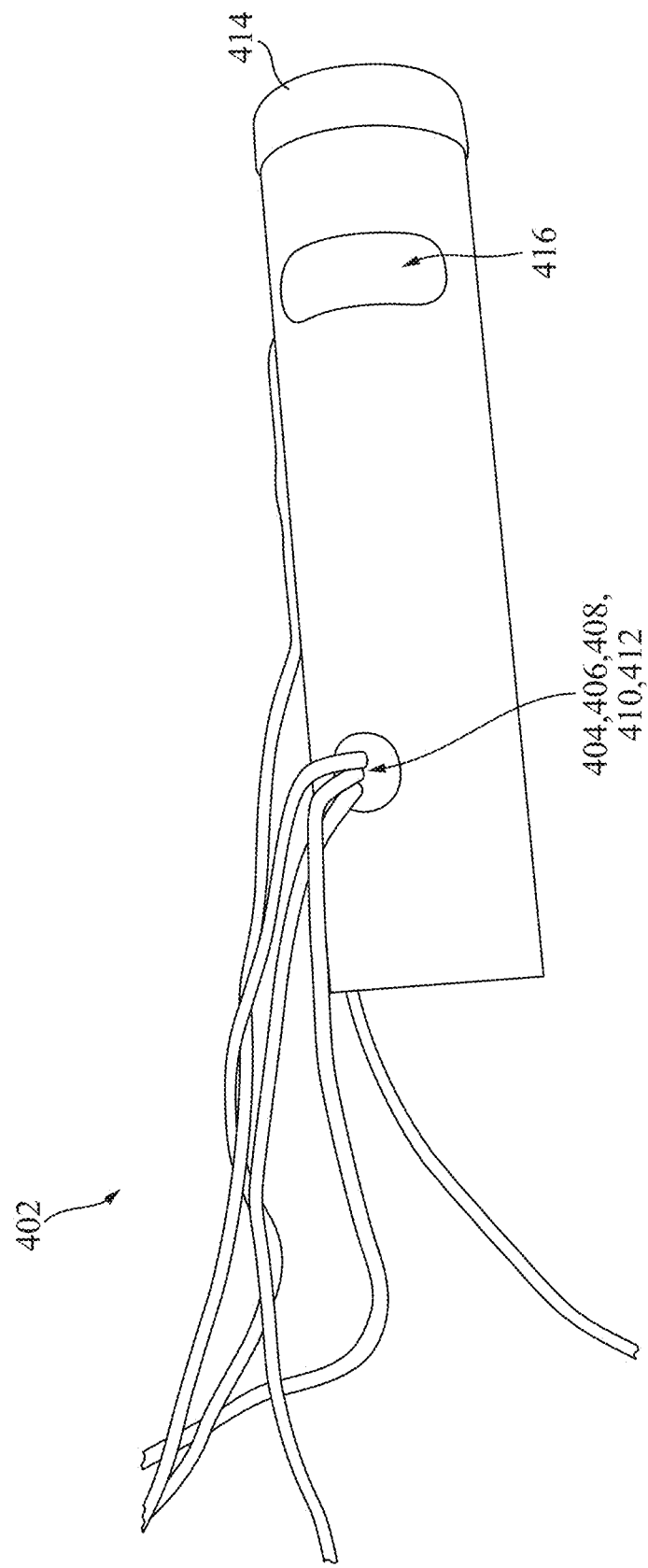
FIG. 4B is a perspective view of the modified electronic smoking article of FIG. 4A.

A perspective view of the modified electronic smoking article 402 of FIG. 4A is shown in FIG. 4B. The five thermocouples (404, 406, 408, 410, 412) are disposed at the various sensing regions of the electronic smoking article 402. The viewing window 416 is structured to allow the infrared camera to view the heating wire element of the modified electronic smoking article 402 with sufficient resolution to resolve the heating element (e.g., wire) from the surrounding background. The viewing window is disposed near the mouth end 414, over the heating wire element.

The combinations, materials, and properties listed in FIGS. 5-13 are exemplary only, and reflect combinations, materials and properties that the inventors believe, at the time of filing this application, would provide characterization and thermal profiling of electronic smoking articles. Further research may reveal suitable thermocouple combinations, materials and material properties other than those listed in the Figures both with respect to capturing surface average and maximum temperatures, capturing heating coil average and maximum temperatures, number of puff sets, puffs per set, number of thermocouples, and location of thermocouples. Therefore, while FIGS. 5-13 list various specific thermal properties, thermocouple locations, and number of thermocouples, the thermal profiling system is not limited to these specific configurations. Other thermoplastic materials and configurations can be used. Further, the thermal profile system is not limited to the configuration listed below. Other thermal profile systems can be used for characterizing the electronic smoking article including, but no limited to, emissivity mapping.

As described below in relation to FIGS. 5-13, six electronic smoking articles (2, 3, 4, 5, 6, 7) are tested using the thermal profile system 200. Each electronic smoking article (2, 3, 4, 5, 6, 7) includes modifications to accommodate five thermocouples disposed on the surface of the heating element. A viewing window is created in each electronic smoking articles (2, 3, 4, 5, 6, 7) to accommodate an infrared camera. The electronic smoking articles (2, 3, 4, 5, 6, 7) are similar to the electronic smoking article 402 described above in FIGS. 4A and 4B. Testing the electronic smoking articles (2, 3, 4, 5, 6, 7) includes exposing each one to the same puff regimen. The puff regimen includes a 3±0.3 sec puff duration followed by 27±1 sec pause (30±1 sec total cycle time), a 55±3 mL puff volume (determined from puff duration and puff flow rate; a nominal 1.1 L/min average airflow rate through test article for 3 sec), 20-puff cycles per puff set (equates to 10 min of simulated puffing), nine puff sets, and a 10±1 min pause between the puff sets. Thus, the puffing regimen is expected to produce at least 180 puffs (9 puff sets with 20 puffs per set). This puffing regimen produces about 180 puffs (9 puff sets with 20 puffs per set).

In some embodiments, a puff of the electronic smoking article 202 is defined as indicated by the illumination of a constant, LED indicator light at the end of the battery upon puff engine activation. A solid (e.g., constant) LED for approximately 3 seconds is indicative of a completed puff. A flashing LED after constant light would count as a puff since that is an indication of the electronic smoking article approaching termination, but still functioned. A flashing white LED upon induced puff flow is an indication of a spent cartridge and would not count as a puff. A red flashing LED indicated the electronic smoking article's battery had been exhausted and the test would be terminated. If there is no LED illumination of any manner upon an attempted the puff is not counted and is interpreted as inadequate seal with (or within) the flow cell to generate adequate flow. In the event that fewer puffs are achieved because the control chip on one of the electronic smoking articles purposely halted operation (e.g., the LED flashing white or red upon a physical puff of induced airflow by the puff engine), then the test is stopped, considered complete, and the number of puffs documented.

The test parameters for testing the electronic smoking articles (2, 3, 4, 5, 6, 7) are: the puff flow rate and volume captured by the pneumatic system 201 on the first and last puff set; the TPM captured by the filter pads 214 on the first and last puff set; the heating element wire temperate captured by the infrared camera 226 on each puff of each puff set; and the target surface temperatures captured by each of the fiver thermocouples on each puff of each puff set. The thermocouple temperature and flow rate data is generated and collected on the data acquisition system 206. The heating element wire temperature is generated and collected on software (e.g., ResearchIR® Max Software) on the computing device 228. For each test, the measured surface temperatures—as indicated by the thermocouples—are plotted as a function of time and the maximum temperature within each 20-puff set at each location is tabulated. Also, the average maximum, range the minimum-maximum interval (i.e., the range of the maximum measured temperatures) and the average and standard deviation ("SD") of the maximum surface temperature are calculated. The trends of the maximum temperatures are obtained from the tabulated data.

Similarly, the measured heating element wire temperatures are plotted as a function of time and the maximum temperature within each 20-puff set is tabulated along with the minimum-maximum interval. Further, the average maximum wire temperature for each 20-puff set is tabulated, as well as the minimum-maximum interval. The heating element is comprised of a wire wrapped around a wick, thus the optimal testing setting is to capture as many wraps as possible in the view of the infrared camera 226 lens. As will be appreciated the number of wraps "in focus" may fluctuate based on the optic of the infrared camera 226 used. For example, if the heating element has up to five revolutions of the wire visible, the center three revolutions of the wire may be assessed because they are the clearest for focusing the infrared camera 226 on for accurate measurement.

FIG. 5 shows a summary of the operation of each electronic smoking article (2, 3, 4, 5, 6, 7). As is readily apparent, the fifth electronic smoking article included several incomplete activations and is therefore removed from the results and data collection of testing using the thermal profile system 200.

Referring to FIG. 6, the overall average (±SD) maximum surface and wire temperatures (° C.) for each of the five electronic smoking articles (as the fifth electronic smoking article is removed due to incomplete activations) used is shown. As shown in FIG. 6, and described in greater detail in the figures below, the thermal profile system 200 is able to capture and characterize the electronic smoking articles (abbreviated "ESA"). For example, within a puff set, the surfaces did not cool to ambient temperature between consecutive puffs. However, between puff sets, all surfaces cooled to ambient before initiating the succeeding puff set. Within a puff set of twenty puffs, the maximum temperatures are generally the lowest at the beginning of a puff set and highest at the end of a puff set. The "Flow Tube" and "Substrate" maximum temperatures generally tend to increase over successive puff sets, by upwards of 10° C. and 5° C., respectively, from the first to last puff set.

The relative maximum surface temperatures at each location are expected given their relative locations to the wire heating element and airflow path. Specifically, that the $T_{Flow\ Tube} > T_{Substrate} > T_{Sleeve\ Inside} > T_{Sleeve\ Outside} \sim T_{Mouthpiece}$. The "Sleeve Inside", Sleeve Outside", and "Mouthpiece" are further removed from the heat source of the wire heating element and thus do not reach maximums as high as the "Flow Tube" or "Substrate." The inside and outside walls of the "Plastic Sleeve" and "Mouthpiece" maximum temperatures are generally stable (e.g., maximum average temperature is within ±5° C.) over the nine puff sets. Additionally, there is typically a consistent, steep increase (>100° C.) in maximum temperatures of the wire heating element during the first and, sometimes, second puff set. Interestingly, after the first two puff sets, (e.g., puff sets 3-9), the average maximum wire heating element temperatures are fairly consistent as they did not increase by more than 50° C. in most instances. Finally, by the ninth puff set (puff numbers 160-180), a lower TPM per puff output relative to that measured during the first puff set (puffs 1-20) is observed, indicating that the vaporized liquid source is being depleted.

FIG. 7 is a summary of the average maximum surface temperatures for all five electronic smoking articles at each location and for each puff set. The average, standard deviation, and range (e.g., minimum and maximum) of the maximum temperatures over all puffs in aggregate are shown. As is readily apparent, there are instances where the peak temperature is not well defined and less than 30° C. In those instances, the temperature is reported as <30° C.

Figure 8:
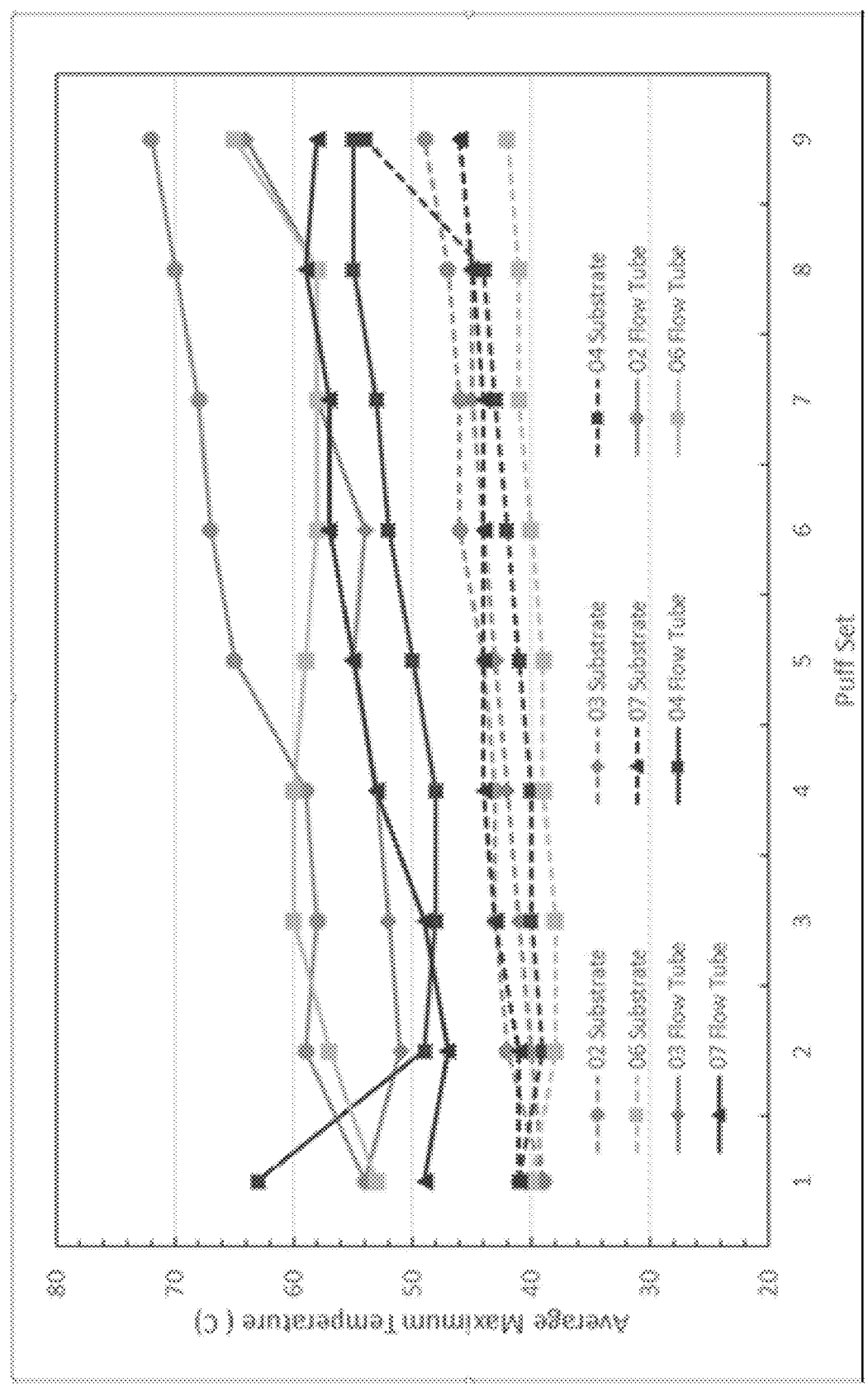
FIG. 8 is graphical representation of the maximum average "Substrate" and "Flow Tube" location temperatures for each electronic smoking article of FIG. 5.

Referring to FIG. 8, the maximum average "Substrate" and "Flow Tube" location temperatures are plotted for each electronic smoking article over the nine puff sets. As the location of the flow tube thermocouple is in relative close proximity to the wire heating element and/or heated air path compared to the flow tube location, the substrate location had higher average maximum temperature performance.

Figure 9:
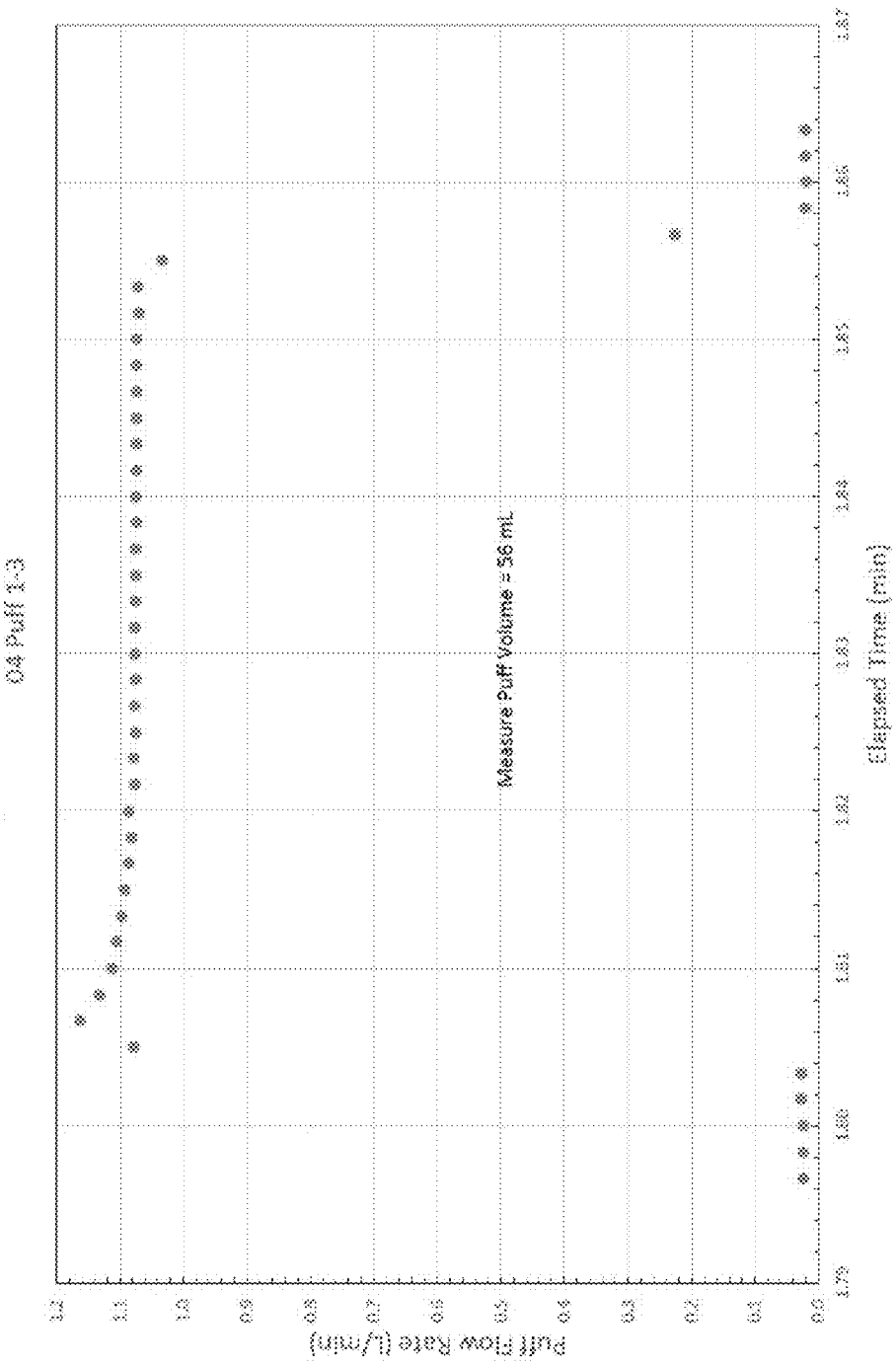
FIG. 9 is a graphical representation of the measured flow rate as a function of time for a single puff of a puff set for one of the electronic smoking article of FIG. 5.

Turning to FIG. 9, a representative plot of the measured flow rate as a function of time for a single puff for the first and ninth puff sets is shown. The three-second puff is shown for the fourth electronic smoking article performing properly using the pneumatic system 201 to achieve a 55±3 mL puff volume over a 3±0.3-sec puff duration. The measured puff volume is obtained by numerically integrating the area under the flow rate versus time curve.

Figure 10:
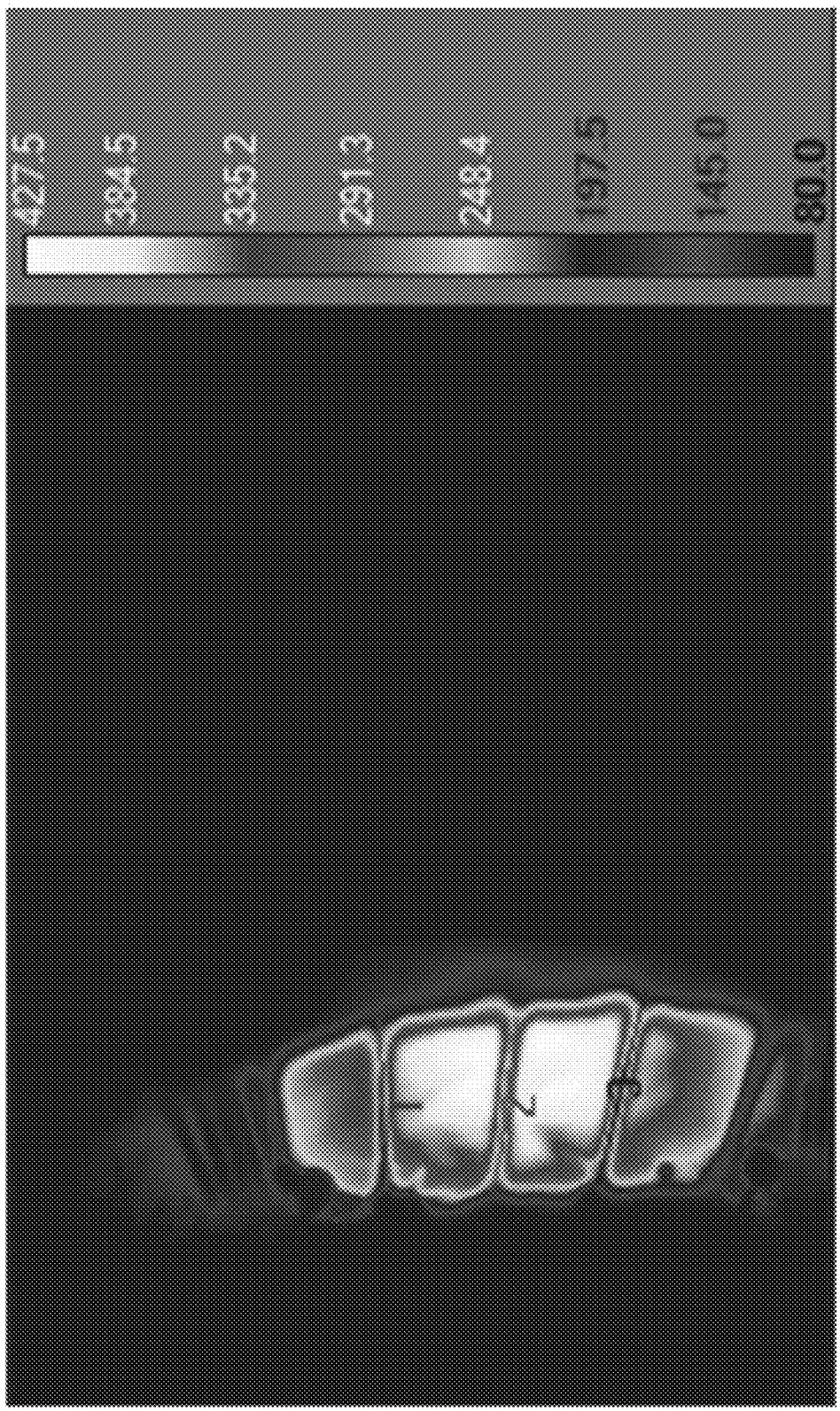
FIG. 10 is a thermal image of a wire heating element of one of the electronic smoking articles of FIG. 5.
Figure 12:
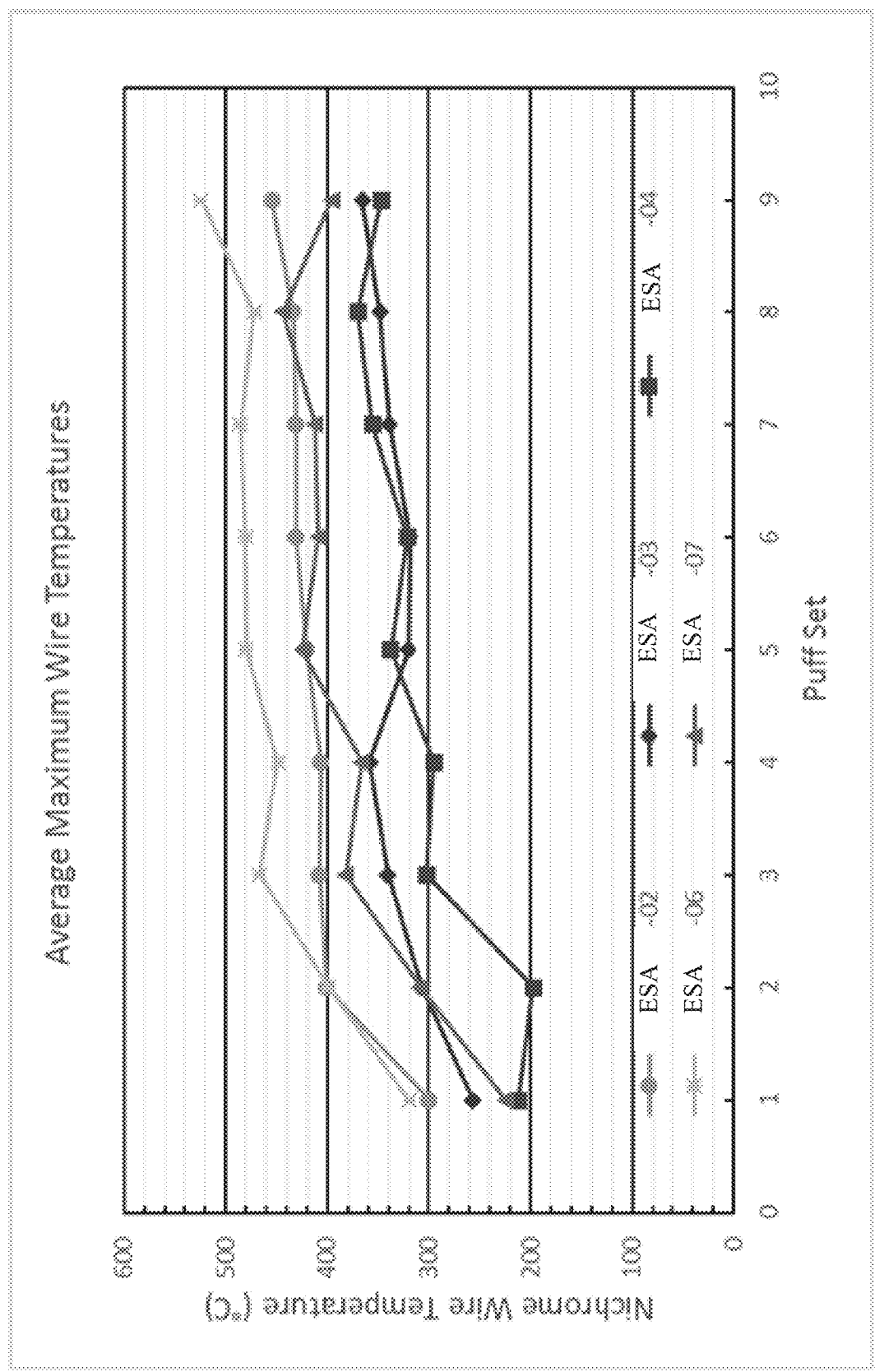
FIG. 12 is a graphical representation of the average maximum temperature of the heating element for each puff set for each electronic smoking article shown in FIG. 11.

FIGS. 10-12 represent data collected and analyzed by the infrared camera 226 of the wire heating element. The wire heating element temperature measurements are based on the specific lines formed by the wire. Generally, within a puff set of twenty puffs, the maximum wire heating element temperatures are the lowest at the beginning of the set and highest at the end of the set. Further, within a puff set, the maximum wire heating element temperature is relatively consistent as the maximum temperatures did not deviate by more than 50° C. Notably, there was a consistent, steep increase (of >100° C.) in maximum temperatures during the first, and sometimes second, puff set.

As shown in FIG. 10, thermal imaging is depicted of the wire heating element captured by the infrared camera 226. Because the wire heating element had up to five revolutions of the wire visible, the center three revolutions of the wire are assessed because they are the ones that could be best brought into focus for an accurate measurement by the infrared camera 226.

The average maximum temperature of the heating element for each puff set for each electronic smoking article is shown in FIG. 11. Further, FIG. 11 shows the maximum temperature, standard deviation, and range (minimum and maximum) statistics for all 180 puffs. FIG. 12 shows a plot of the average maximum temperature of the heating element for each puff set for each electronic smoking article shown in FIG. 11.

Turning to FIG. 13, a summary of the averaged measured TPM per puff and puff flow properties is shown. The average measured TPM per puff is shown for the first and ninth puff set. The associated measured puff flow parameters of puff duration (t) and puff volume (V) are shown along with the average TPM per puff. The average TPM per puff is calculated by dividing the cumulative mass of TPM collected on a filter and dividing by the number of puffs (nominally 20 per puff set) over which the mass is collected. Accordingly, the average TPM per puff is based on a single measurement and does not have associated standard deviation. Notably, the first puff set yielded more TPM than the last puff set.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, while multiple embodiments describe various dimensions and connections of the thermal profile system, it is anticipated that the components of the thermal profile system instrument may have a connection cross-section of a wide variety of target shapes and sizes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The computer readable program code (e.g., identification code) embodied on a processing circuit may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A thermal measurement system comprising:
   a thermocouple configured to couple to a location of a heating element of an electronic smoking article, the thermocouple structured to measure a surface temperature of the location;
   a thermocouple data module operatively connected to the thermocouple, the thermocouple data module structured to receive data of the surface temperature from the thermocouple;
   a pneumatic system configured to connect to an end of the electronic smoking article and draw an air flow through the electronic smoking article, the pneumatic system comprising a valve having an open state and closed state, wherein the open state causes air to flow through the electronic smoking article, and wherein the closed state prevents air flow through the electronic smoking article; and
   an infrared camera disposed over a viewing window of the electronic smoking article, the viewing window disposed over a heating element of the electronic smoking article, the infrared camera configured to measure a temperature of the heating element of the electronic smoking article.

2. The thermal measurement system of claim 1, further comprising a filter disposed in a flow path of the pneumatic system, the filter configured to minimize condensation in the thermal measurement system.

3. The thermal measurement system of claim 2, wherein the filter is configured to capture aerosol-collected particulate matter in the air that flows through the electronic smoking article, and wherein the captured aerosol-collected particulate matter is used for gravimetric analysis to measure total particulate matter.

4. The thermal measurement system of claim 1, wherein the thermocouple is a first thermocouple and the location is a first location, and further comprising a second thermocouple, a third thermocouple, a fourth thermocouple, and a fifth thermocouple.

5. The thermal measurement system of claim 4, wherein:
   the first thermocouple is disposed on a first location perpendicular to the heating element,
   the second thermocouple is disposed on a second location directly under the heating element,
   the third thermocouple is disposed on a third location perpendicular to the heating element,
   the fourth thermocouple is disposed on a mouth piece of the electronic smoking article, the mouth piece downstream from the heating element, and
   the fifth thermocouple is disposed on an outer surface of the electronic smoking article parallel to the heating element.

6. The thermal measurement system of claim 1, wherein the location of the thermocouple on the heating element is disposed on the heating element, and wherein the surface temperature captured by the thermocouple and the temperature captured by the infrared camera are indicative of an emissivity of the heating element.

7. The thermal measurement system of claim 1, further comprising a controller operatively connected to the pneumatic system, the controller configured to control opening and closing of the valve according to a puff regimen, the puff regimen associated with testing one or more characteristics of the electronic smoking article.

8. The thermal measurement system of claim 7, wherein the controller is configured to control opening and closing of the valve according to a target flow rate, the target flow rate associated with simulating a puff of the electronic smoking article.

9. The thermal measurement system of claim 8, further comprising a human machine interface operably connected to the controller, the human machine interface configured to allow a user to start, stop, and alter operations of the pneumatic system.

10. The thermal measurement system of claim 1, wherein the pneumatic system further comprises a vacuum pump configured to pull air through the electronic smoking article via a plurality of tubing systems.

11. The thermal measurement system of claim 10, wherein the pneumatic system further comprises a valve controller operatively connected to the plurality of tubing system, the valve controller configured to provide and restrict flow through the plurality of tubing systems to achieve a square wave puff profile.

12. The thermal measurement system of claim 1, wherein the pneumatic system is configured to simulate a smoking activity and a time component, the smoking activity comprising at least one of puff number, puff duration, and inter-puff interval, the time component comprising at least one of activity time, activity duration, and activity period.

13. The thermal measurement system of claim 1, wherein the infrared camera is operatively connected to a computing system, the computing system comprising local memory structured to store data of the temperature of the heating element captured by the infrared camera.

14. The thermal measurement system of claim 1, wherein the thermocouple data module is operatively connected to a computing system, the computing system comprising local memory structured to store data of the surface temperature from the thermocouple.

15. The thermal measurement system of claim 1, wherein the valve comprises a solenoid valve.

16. A method for thermal measurement of an electronic smoking article, the method comprising:
   activating a pneumatic system in accordance with a determined puff regimen, the determined puff regimen associated with testing one or more characteristics of the electronic smoking article, wherein the pneumatic system includes a vacuum pump configured to pull air through the electronic smoking article via a tubing system and a valve, and wherein the valve has an open state and closed state, wherein the open state causes air to flow through the electronic smoking article, and wherein the closed state prevents air flow through the electronic smoking article;

adjusting the vacuum pump to a determined target flow rate, the determined target flow rate associated with simulating a puff of the electronic smoking article;

opening the valve for a puff duration of the puff regimen;

capturing a surface temperature of a location of the electronic smoking article using a thermocouple coupled to the location of the electronic smoking article; and capturing a temperature of a heating element of the electronic smoking article using an infrared camera.

17. The method of claim 16, further comprising:

closing the valve for a pause duration of the puff regimen;

opening the valve for the puff duration of the puff regimen;

capturing a second surface temperature of the location of the electronic smoking article using the thermocouple; and capturing a second temperature of the heating element of the electronic smoking article using the infrared camera.

18. The method of claim 16, further comprising:

completing a puff cycle of the puff regimen, the puff cycle comprising:
   closing the valve for a pause duration of the puff regimen;
   opening the valve for the puff duration of the puff regimen;
   capturing a surface temperature of the location of the electronic smoking article using the thermocouple; and
   capturing a temperature of the heating element of the electronic smoking article using the infrared camera;

completing a plurality of puff cycles of the puff regimen to achieve a puff set; and completing a plurality of puff sets of the puff regimen, wherein a plurality of surface temperature are captured using the thermocouple and a plurality of temperatures are captured using the infrared camera for each puff cycle of each puff set.

19. The method of claim 16, wherein the thermocouple is a first thermocouple and the location is a first location, the thermal profiling method further comprising:
   disposing the first thermocouple on the first location perpendicular to the heating element;
   disposing a second thermocouple on a second location directly under the heating element;
   disposing a third thermocouple on a third location perpendicular to the heating element;
   disposing a fourth thermocouple on a mouth piece of the electronic smoking article, the mouth piece downstream from the heating element; and
   disposing a fifth thermocouple on an outer surface of the electronic smoking article parallel to the heating element.

20. The method of claim 19, further comprising:
   capturing a surface temperature of the first location of the electronic smoking article using the first thermocouple;
   capturing a surface temperature of the second location of the electronic smoking article using the second thermocouple;
   capturing a surface temperature of the third location of the electronic smoking article using the third thermocouple;
   capturing a surface temperature of mouth piece of the electronic smoking article using the fourth thermocouple; and
   capturing a surface temperature of the outer surface of the electronic smoking article using the fifth thermocouple.

21. The method of claim 16, wherein the pneumatic system further comprises a filter pad disposed in the tubing system of the pneumatic system, and the method further comprising capturing aerosol-collected particulate matter using the filter pad.

22. The method of claim 16, wherein the tubing system comprises a plurality of tubing systems.

23. The method of claim 22, further comprising a valve controller, the valve controller configured to direct air through the plurality of tubing systems, and wherein the thermal profiling method further comprises adjusting the valve controller to direct air through the plurality of tubing systems to achieve a square wave puff profile.

24. The method of claim 16, wherein the valve comprises a solenoid valve.

* * * * *